Aug. 29, 1939.  S. N. HURT  2,170,798
WEIGHING SCALE
Filed Jan. 21, 1938
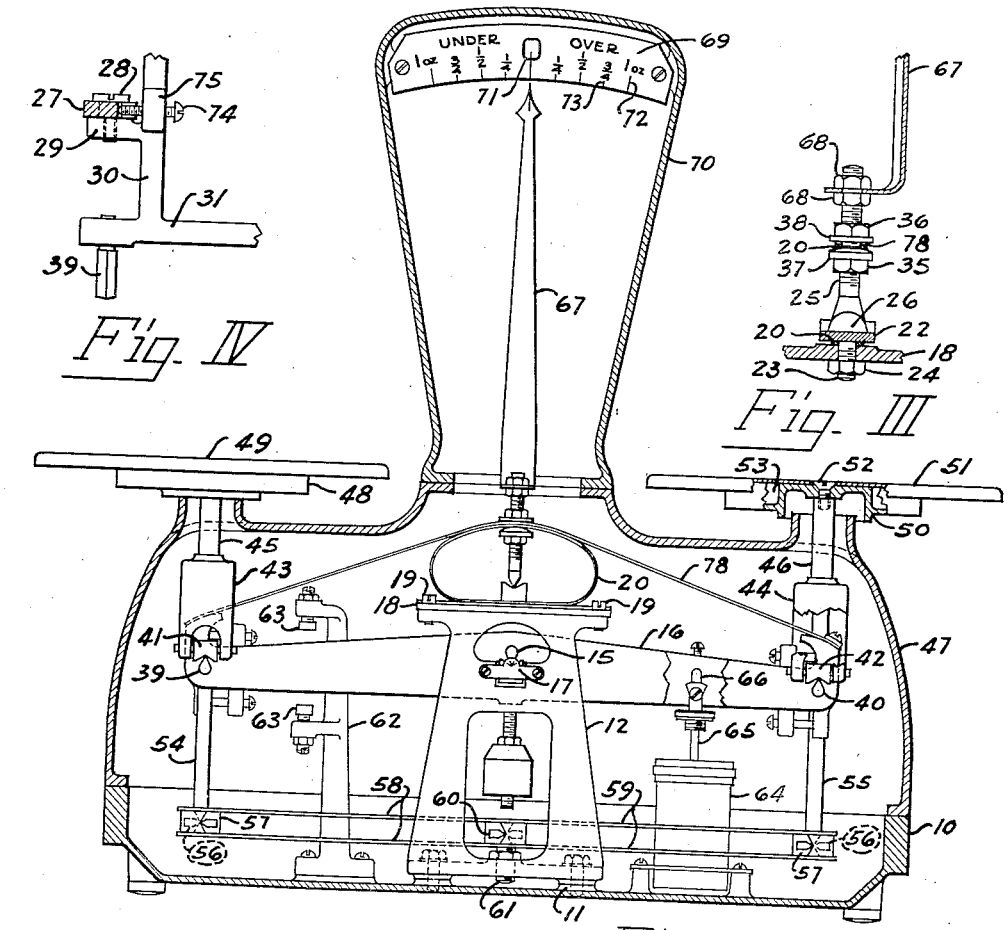
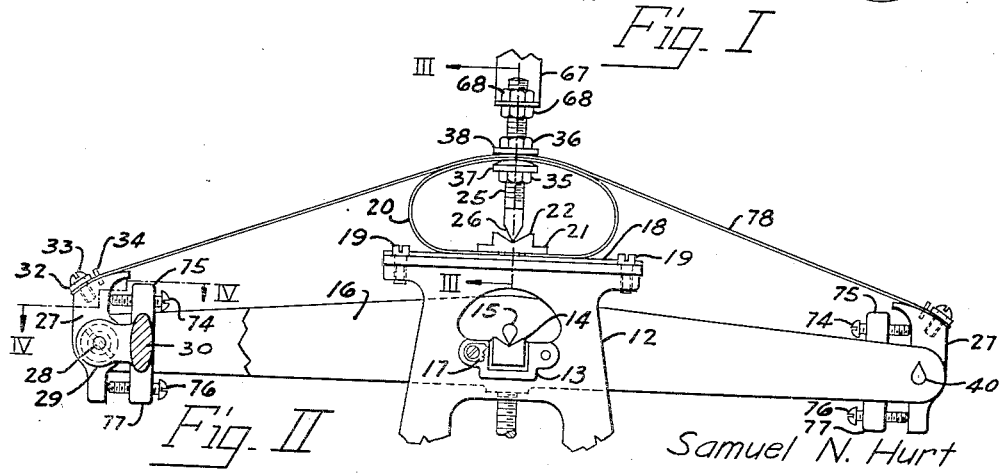
Samuel N. Hurt
INVENTOR
BY Marshall & Marshall
ATTORNEYS Patented Aug. 29, 1939

2,170,798

UNITED STATES PATENT OFFICE 2,170,798

WEIGHING SCALE

Samuel N. Hurt, Toledo, Ohio, assignor to Toledo Scale Manufacturing Company, Toledo, Ohio, a corporation of New Jersey Application January 21, 1938, Serial No. 186,091

6 Claims. (Cl. 265—58)

This invention relates generally to scales, and more particularly to scales of the even balance type in which means are provided for indicating the amount over or under a predetermined weight.

The principal object of the invention is a scale having a novel type of load resistance which is so designed and calculated so as to withstand all the stresses and deformation it may be subjected to.

Another object is the provision of improved adjustment means for the resistance member.

And still a further object is the provision of an improved indicating means.

These, and other objects and advantages will be apparent from the following description, in which reference is had to the accompanying drawing illustrating a preferred embodiment of the invention wherein similar reference numerals refer to similar parts throughout the several views.

In the drawing:

Fig. I is a front elevational view of a scale constructed in accordance with the present invention, parts thereof being shown in vertical section.

Fig. II is an enlarged elevational view of the scale beam and the load resistance means.

Fig. III is an enlarged sectional view of the indicator mounting sectioned substantially along the line III—III of Fig. II; and, Fig. IV is an enlarged fragmentary plan view of a portion of the beam seen substantially from the line IV—IV of Fig. II.

Referring to the drawing in detail:

The scale comprises a base 10 which preferably is in the form of a rigid iron casting and provided with machined pads 11 upon which a substantially U-shaped frame 12 is bolted. The upwardly extending arms of this U-shaped frame are provided, near the upper ends, with the shelf-like portion 13 in which bearings 14 are mounted. These bearings 14 support fulcrum pivots 15 of a beam or lever 16. Thrust caps 17, screwed to the outer faces of the upwardly extending arms of the U-shaped frame are provided to limit lateral displacement of the lever. The upper edges are machined and a flat steel plate 18 is fastened thereto by means of the screws 19.

For the purpose of counterbalancing unbalanced increments of load, a load resistance 20 in the form of a circular resilient loop is provided. The ends of this loop rest on the plate 18 and are clamped thereto by a flat washer-like base 21 of a pivot bearing 22 which is provided with a V-shaped groove. Since the ends of the loop 20 are clamped together, the loop functions in the same manner as though it were an endless hoop or loop of resilient metal. It will therefore be denominated a "functionally endless loop" in some of the subjoined claims. This bearing has an integral threaded stem 23 which projects through a hole in the plate 18 and a nut 24 is adapted to firmly draw the washer-like portion 21 into engagement with the ends of the load resistance 20. The V-shaped groove of this bearing forms a seat for a fulcrum stud 25, the lower end 26 of which is swedged into knife edge pivot form. The upwardly projecting straight portion of the stud is threaded and projects through an aperture in the resistance 20 and an actuating ribbon 78, the ends of which are clamped to sectors 27 adjustably pivoted on shoulder screws 28 which are threaded into ears 29 projecting outwardly from lateral arms 30 connecting the longitudinal arms 31 of the lever 16. The clamping means comprise a formed washer 32 and a screw 33. A locating pin 34 passing through an accurately located hole adjacent the ends of the actuating ribbon 78 is preferably driven into the sectors 27. The resistance member 20 and the actuating ribbon are clamped to the stud 25 by the cooperation of two nuts 35 and 36, a block 37, which has a cylindrical surface and engages the inside face of the resistance, and a flat washer 38 positioned between the outer face of the actuating ribbon and the nut 36.

The free ends of the lever 16 are provided with upwardly directed pivots 39 and 40 upon which engage bearings 41 and 42 of counterpoise supporting spider 43 and load supporting spider 44 respectively. Posts 45 and 46 studded into the spiders 43 and 44 project upwardly through openings in a base cover 47. The bottom edge of this base cover 47 rests on the upper edge of the base and is fastened thereto; and forms a housing for the mechanism which is mounted on the base 10. A platter spider 48 is fastened to the projecting portions of the post 45, and this spider is surmounted by a counterpoise platter 49. In a similar manner, a platter spider 50 and a load platter 51 are bolted to the upper ends of the posts 46 by means of screws 52. The platter spiders 48 and 50 are provided with cavities 53 for the reception of lead shot, or other small weights, for readily obtaining a balance of the lever mechanism. To maintain the condition of level of the platters 49 and 51, the spiders 43 and 44 have downwardly extending stems 54 and 55 respectively, provided with the usual opposed pivots 56 which engage bearings 57 of check links 58 and 59. The inner ends of these check links 58 and 59 engage opposed pivots 60 secured to studs 61 which are adjustably threaded into apertures in the base of the U-shaped frame 12. Since all scales of the "Roberval" type are provided with check links it is not deemed necessary to describe these in greater detail.

To limit the extent of the angular movement of the lever 16 a bumper bracket 62 is bolted to the base and bumpers 63 are adjustably threaded in horizontally extending arms so that they may be engaged by an arm of the lever 16. For the purpose of damping the vibration of the scale a dashpot 64 is provided whose plunger stem 65 is pivotally connected to an arm 66 extending laterally from one of the longitudinal arms of the lever 16.

When equal weights are placed on the platters 49 and 51 the equilibrium of the balance will not be disturbed but to indicate any difference between the weights on the two platters an indicator 67 is clamped to the stud 25 by means of two nuts 68. This indicator cooperates with a graduated chart 69 fixed in the upper end of a housing 70 which surmounts the base cover 47.

The resilient load resistance 20 before it is assembled to the plate 18 is a straight resilient steel strip to which the flexible ribbon 78 is clamped by means of the nuts 35, 36 and the indicator fulcrum stud 25. When it is clamped to the plate 18, as shown in Figures I and II, before the ends of the ribbon are fastened to sectors 27, it assumes a substantially circular shape which due to compression when the ends of the ribbon 78 are fastened to the sectors 27 changes to an ellipsoidal shape substantially as shown in Figures I and II, and the knife edge on the end of the stud 25 rests in the V of the bearing 22. If the sectors 27 are in their proper position, that is the locating pins 34 are equidistant on each side of a plane passing vertically through the edges of fulcrum pivots 15 of the lever 16, the resistance member 20 exerts equal but opposite forces on the lever 16 and the indicator 67 when this lever 16 is in a balanced, horizontal position. Under these conditions the indicator points to a zero indicium 71 on the chart 69 denoting that the mechanism is in balance. When a standard weight, for example 2 lbs., is placed on the platter 49 and a commodity weighing 2 lbs. 1 oz. is placed on the platter 51 the 2 lb. counterpoise on the platter 49 counterbalances 2 lbs. of the commodity but the unbalanced 1 oz. weight of commodity causes the lever 16 to rotate about its fulcrum pivot 15 in a clockwise direction. This movement is transmitted by the ribbon 78 to the resistance member 20 which is flexed and "rolls" about the axis of the indicator fulcrum stud 25 until its steadily increasing resistance equals the force exerted by the unbalanced portion of the commodity on the platter 51. The indicator 67 which is clamped to the fulcrum stud 25 partakes of this movement and points when the scale is again balanced to the 1 oz. indicium 72 on the chart 69.

If the indicator 67 with the same weights on the platter stops short of the 1 oz. indicium 72, let us assume at an indicium 73, it is an indication that the resistance of the member 20 is too great, that is, it is too "stiff". To overcome this condition, screws 74 which are threaded through ears 75 integral with the lateral arms 30 of the lever 16 are loosened and screws 76 fastened through similar ears 77 are tightened. Since the ends of these screws 74 and 75 engage the sectors 27 on opposite sides of their axes of rotation these sectors are turned inwardly and the ribbon 78 slackened. This permits the nut 35 on the stud 25 to be tightened after nut 36 has been loosened and the resistance member 20 assumes a shape that offers less resistance to the load.

It should now be apparent that when the member 20 permits the indicator to travel beyond the 1 oz. indicium 72 a similar adjustment, but in the opposite direction, will increase its resistance.

It will be seen that the embodiment of the invention herein shown and described is adequately adapted to fulfill the objects primarily stated, it is to be regarded as illustrative only and it is to be understood that the invention is susceptible to variation, modification and change within the spirit and scope of the subjoined claims.

Having described the invention, I claim:

1. In a device of the class described, in combination, a base, a U shaped frame having upper open arms and positioned upon said base, V bearings mounted near the upper ends of said frame, an even-armed lever pivotally mounted upon said bearings for oscillatory movement, a counterpoise platter and a load receiving platter pivotally mounted upon opposite ends of said even-armed lever, a plate connecting the upper open arms of said U frame, a V bearing mounted upon said plate, a relatively movable indicator and chart, the lower end of said indicator having a knife edge and seated with said knife edge in said bearing, a vertically positioned, tensioned load resistance loop of thin flexible resilient metal clamped to said indicator and said plate, means for adjusting the tension of said resistance member comprising nuts cooperating with said indicator and said tension member and adjustable means for connecting said indicator to the opposite ends of said lever, said adjustable means comprising pivoted arcuate faces, a metallic ribbon and screws for adjusting and locking said arcuate faces.

2. In a device of the class described, in combination, a base, a U shaped frame having upper open arms and positioned upon said base, V bearings mounted near the upper ends of said frame, an even-armed lever pivotally mounted upon said bearings for oscillatory movement, a counterpoise platter and a load receiving platter pivotally mounted upon opposite ends of said even-armed lever, a plate connecting the upper open arms of said U frame, a V bearing mounted upon said plate, a relatively movable indicator and chart, the lower end of said indicator having a knife edge and seated with said knife edge in said bearing, a vertically positioned, tensioned load resistance loop of thin flexible resilient metal clamped to said indicator and said plate, means for adjusting the tension of said resistance member comprising nuts cooperating with said indicator and said tension member and adjustable means for connecting said indicator to the opposite ends of said lever.

3. In a device of the class described, in combination, a base, a U shaped frame having upper ends mounted upon said base, bearings situated in said frame, an even-armed lever pivotally fulcrumed on said bearings, a counterpoise platter and a load receiving platter pivotally mounted on opposite ends of said even-armed lever, a plate secured to the upper ends of said frame, an indicator bearing secured to said plate, an indicator having a knife edged portion at its lower end seated with said knife edged portion in said bearing, a tensioned load resistance loop of thin flexible resilient metal clamped to said indicator and said plate, means for adjusting the tension of said resistance member and adjustable means for connecting said indicator to the opposite ends of said lever.

4. In a device of the class described, in combination, a base, fixed rigid arms projecting upwardly from said base and pivot bearings positioned adjacent their upper ends, a lever pivotally mounted on said bearings and a load receiving platter mounted on said lever, a plate secured to the upper ends of said arms arising from said base, a bearing, an indicator pivotally mounted in said bearing and a flexed thin metallic member clamped to said indicator, said flexed thin metallic member being clamped to said plate by said bearing and means for connecting said indicator and said flexible member to said lever.

5. In a device of the class described, in combination, the subcombination of a stationary member, a bearing mounted on said stationary member and adapted to clamp the ends of a strip of thin flexure steel forming substantially a functionally endless loop and an indicator having a terminal pivot adapted to engage said bearing and means for adjustably connecting said indicator and said functionally endless loop.

6. In a device of the class described, in combination, a lever, fulcrumed pivots for mounting said lever sustantially midway between its ends, load receiving platters pivotally mounted on the ends of said lever, a bearing positioned above and in a vertical plane passing through said fulcrum pivots of said lever, a functionally endless loop of spring material secured to said plate and an indicator projecting through an aperture in said functionally endless loop and pivoted in said bearing and means for actuating said functionally endless loop in opposition to loads on said platters, said functionally endless loop being adapted to actuate said indicator.

SAMUEL N. HURT.